US012501529B2

(12) United States Patent
Knipp

(10) Patent No.: US 12,501,529 B2
(45) **Date of Patent: *Dec. 16, 2025**

(54) LIGHTING CONFIGURATION ARRANGEMENTS AND METHODS FOR GAMING MACHINES AND GAMING MACHINE INSTALLATIONS

(71) Applicant: Everi Games, Inc., Austin, TX (US)

(72) Inventor: Lawrence J. Knipp, Austin, TX (US)

(73) Assignee: Everi Games Inc., Austin, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 18/240,158

(22) Filed: Aug. 30, 2023

(65) Prior Publication Data

US 2023/0413404 A1 Dec. 21, 2023

Related U.S. Application Data

(63) Continuation of application No. 17/884,413, filed on Aug. 9, 2022, now Pat. No. 11,751,311, which is a (Continued)

(51) Int. Cl.

| | |
|---|---|
| ***H05B 47/105*** | (2020.01) |
| ***A63F 13/28*** | (2014.01) |
| ***F21V 33/00*** | (2006.01) |
| ***G07F 17/32*** | (2006.01) |
| ***H05B 45/20*** | (2020.01) |
| ***H05B 45/44*** | (2020.01) |
| ***H05B 47/16*** | (2020.01) |
| *F21Y 115/10* | (2016.01) |

(52) U.S. Cl.
CPC ........... *H05B 47/105* (2020.01); *A63F 13/28* (2014.09); *F21V 33/008* (2013.01); *G07F 17/3211* (2013.01); *G07F 17/3227* (2013.01); *H05B 45/20* (2020.01); *H05B 45/44* (2020.01); *H05B 47/16* (2020.01); *F21Y 2115/10* (2016.08)

(58) Field of Classification Search
CPC .... A63F 13/28; F21V 33/008; F21Y 2115/00; H05B 45/10; H05B 45/20; H05B 45/44; H05B 47/16; H05B 47/18; H05B 47/105; H05B 47/155; Y02B 20/40
See application file for complete search history.

(56) References Cited

U.S. PATENT DOCUMENTS

2010/0201279 A1 8/2010 Zhao
2010/0216537 A1* 8/2010 Enzminger ......... G07F 17/3258 463/16

FOREIGN PATENT DOCUMENTS

DE 3230226 C2 * 1/1993 ......... G06K 15/1247
EP 2618635 A1 * 7/2013 ............... H05B 5/48

* cited by examiner

*Primary Examiner* — Steven J Hylinski
(74) *Attorney, Agent, or Firm* — Calvert Technology Law, PLLC; Nathan H. Calvert

(57) ABSTRACT

An accent light system for a gaming machine includes an accent light arrangement having a number of LED panels assembled in one of a number of possible configurations. An electronic controller is coupled through a data communication interface to the accent light arrangement. The electronic controller is configured to transmit a signal to LED drivers of the number of LED panels, receive a loop-back signal transmitted from a final one of the LED panels, and, based on timing of the received loop-back signal, identify the configuration of the number of LED panels from the number of possible configurations.

20 Claims, 10 Drawing Sheets

Related U.S. Application Data continuation of application No. 17/061,275, filed on Oct. 1, 2020, now Pat. No. 11,470,704.

(60) Provisional application No. 62/914,986, filed on Oct. 14, 2019.

LIGHTING CONFIGURATION ARRANGEMENTS AND METHODS FOR GAMING MACHINES AND GAMING MACHINE INSTALLATIONS

CROSS-REFERENCE TO RELATED APPLICATIONS

The application is a continuation of U.S. patent application Ser. No. 17/884,413, filed Aug. 9, 2022, entitled "Gaming Machine Installations and Light Panel For Use With Gaming Machines," which application is a continuation of U.S. patent application Ser. No. 17/061,275, filed Oct. 1, 2020, now U.S. Pat. No. 11,470,704 of the same title, which application claims the benefit under 35 U.S.C. 119(e) of U.S. Provisional Patent App. No. 62/914,986 filed Oct. 14, 2019, of the same title. The entire content of each of these prior applications is hereby incorporated herein by reference for all purposes.

TECHNICAL FIELD OF THE INVENTION

The invention relates to accent lighting in gaming systems. More particularly, the invention relates to gaming machines and gaming machine installations and methods that provide accent lighting.

BACKGROUND

Gaming machines, such as slot machines deployed on a casino floor, are generally regulated by an authority such as a state or federal gaming commission. The regulations govern most aspects of the gaming machine operation, including how updates and upgrades are to be performed. Typically, most types of updates or upgrades to a gaming machine require the update itself, such as new software, new firmware, or certain types of new hardware, to be approved by a regulator. The personnel allowed to perform updates are also regulated.

While such regulatory schemes help ensure the wagering game industry is honest and fair to the consumers, they can make it burdensome to perform updates even to superficial or ornamental elements of the gaming machine, such as accent lighting. When updates are made to accent lighting like an LED panel display, often a software driver that synchronizes the accent lighting to the gaming operation must be updated as well. Making such a change typically requires new driver software to be submitted to a regulatory authority, even to make minor upgrades such as adding internal or external lighting panels or increasing the density of LEDs in a lighting panel. There exists a need for better ways to identify, update, and upgrade such lighting features on gaming machines and installations of gaming machines.

SUMMARY

An accent light controller, method, and light panel are used to provide accent lighting for gaming machines. The light panel provides an accent light arrangement that includes a series of LED panels. A command is transmitted through the series of LED panels to a final LED driver of the final LED panel in a series of LED panels. In response, an indicator such as a loop-back signal is transmitted back through the series of LED panels to an electronic controller. Based on timing of received indicator, a number of LED drivers in the LED panels is determined. Based on the number of LED drivers, a configuration of the LED panels is determined from a number of possible configurations. Subsequent commands for activating the LED drivers of the LED panels are transmitted based on the identified configuration.

According to one aspect of invention, a method includes at a final LED panel in a series of LED panels, receiving a command transmitted through the series of LED panels to a final LED driver of the final LED panel. In response to receiving the command, the method transmits an indicator such as a loop-back signal back through the series of LED panels to an electronic controller at a gaming machine. The indicator is received at the electronic controller. Based on timing of received indicator, the method determines a number of LED drivers in the LED panels. Based on said number of LED drivers, the method selects a configuration of the LED panels from a number of possible configurations. Subsequent commands are transmitted for activating the LED drivers of the LED panels based on the identified configuration.

According to another aspect of the invention, a light panel is adapted to be coupled to a gaming machine. The light panel includes a light panel front cover aligned along a panel cover plane, a light panel housing supporting the light panel front cover in an operating position, and an accent light assembly housed within the light panel housing and comprising a plurality of LED panels adapted for mounting along the light panel front cover in an operating position. Each LED panel including a plurality of LED drivers arranged in series communication and coupled to drive respective LEDs, and loop-back control logic operable to determine if the LED panel is the final LED panel in a series of LED panels, and if so transmit an indicator such as a loop-back signal back through the series of LED panels to an external controller when a command is received at a final one of the LED drivers on the final LED panel.

According to another aspect of the invention, an accent light controller adapted to be installed in a gaming machine and includes a data communication interface adapted to connect to a communication channel, and an electronic controller coupled to communicate through said data communication interface with a plurality of LED panels arranged in series at an external lighting panel. The electronic controller is programmed to transmit signals to LED drivers of the LED panels and receive a loop-back signal transmitted from a final one of series of LED panels. Based on timing of said received loop-back signal, the electronic controller determines a number of LED drivers in the LED panels, and based on said number of LED drivers, identifies a configuration of the LED panels from a number of possible configurations. The electronic controller then transmits commands for activating the LED drivers of the LED panels based on the identified configuration.

According to various embodiments of the above aspects, lighting sequence information may be received at the accent lighting controller for synchronizing a lighting sequence of the LED panels with a lighting sequence of lights mounted in the gaming machine. Determining a number of LED drivers in the LED panels may include determining a number of data clock cycles for the command to pass through the series of LED panels and the indicator to return back to the controller. Identifying a configuration of the LED panels may include comparing the number of LED drivers in the LED panels to a set of stored configuration data for multiple different LED panel configurations. The indicator transmitted back to the electronic controller may be the command received at the final LED driver.

DESCRIPTION OF REPRESENTATIVE EMBODIMENTS

Figure 1:
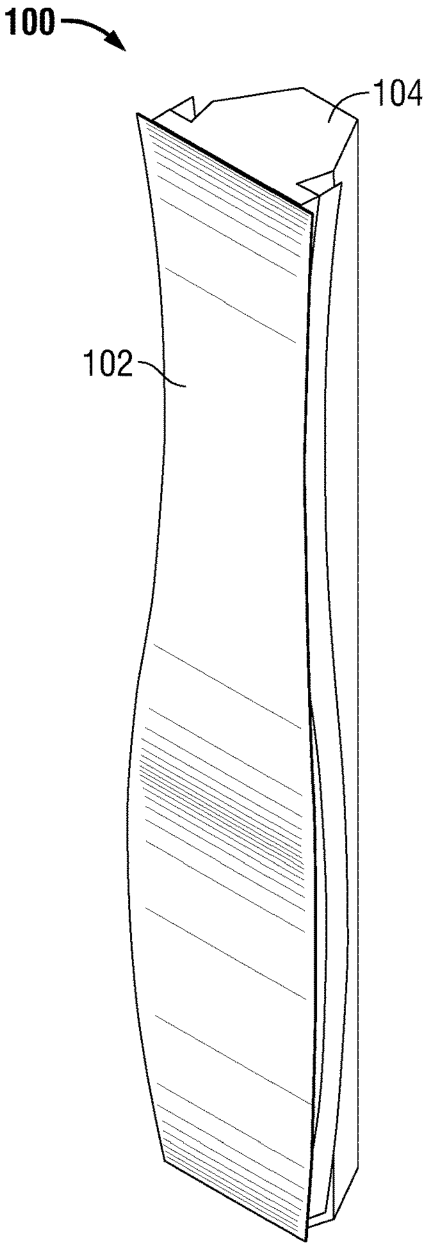
FIG. 1 is a perspective view of a gaming machine light panel that may be placed in a gaming machine installation between two gaming machines.
Figure 2:
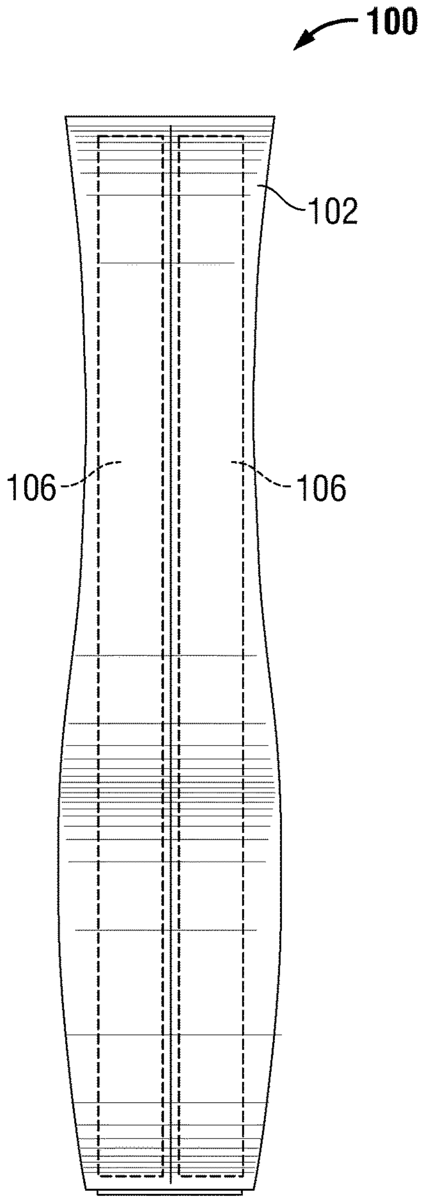
FIG. 2 is a front view of the gaming machine light panel shown in FIG. 1.
Figure 3:
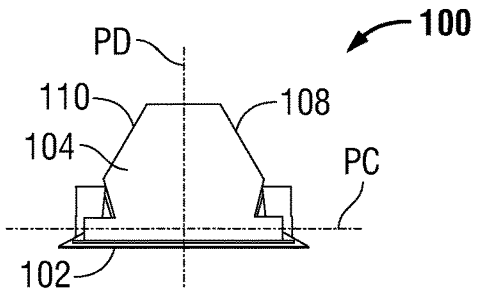
FIG. 3 is a top view of the gaming machine light panel shown in FIG. 1.
Figure 4:
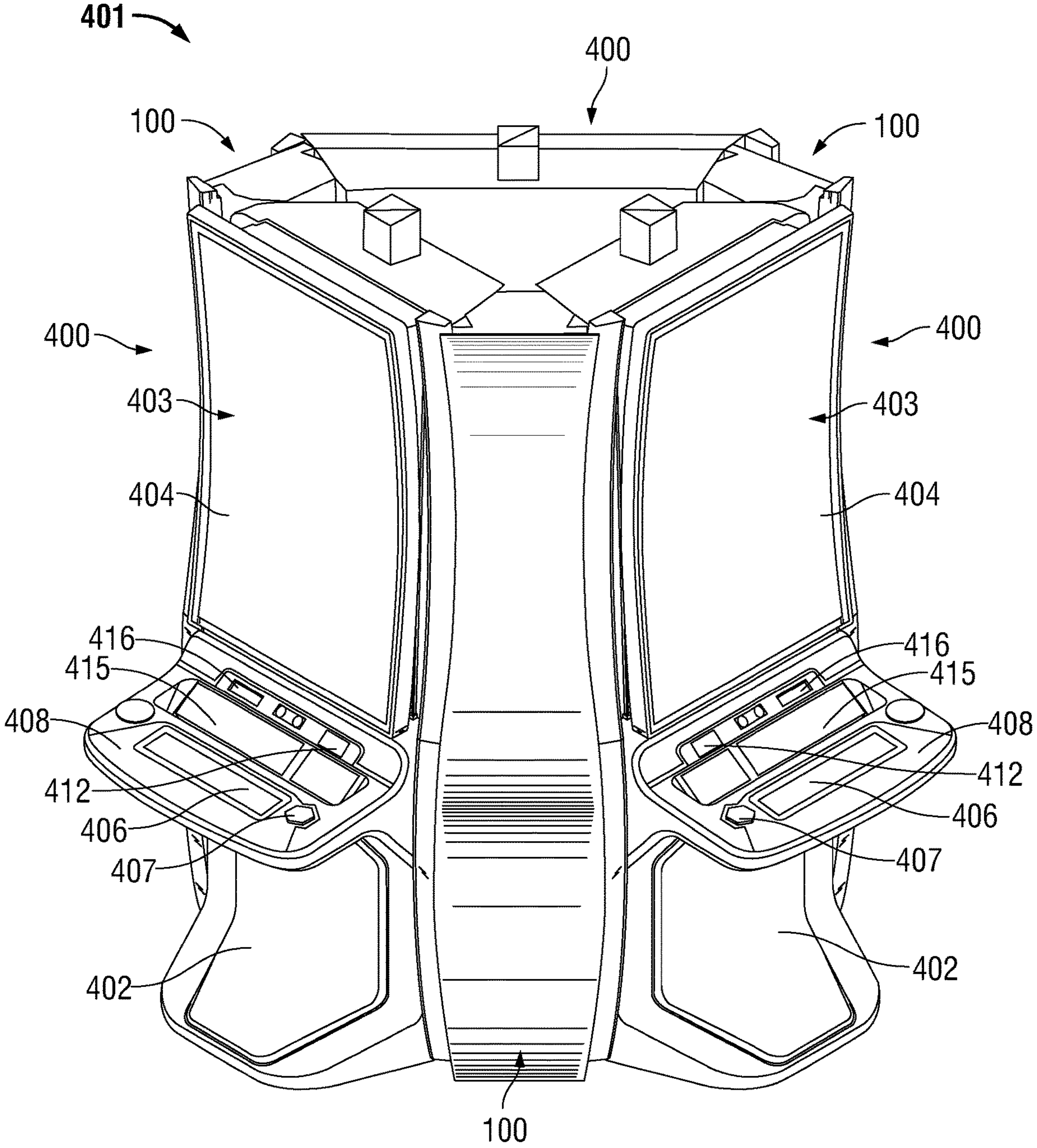
FIG. 4 is a perspective view of a gaming machine installation including a respective light panel as shown in FIGS. 1-3 connected between each gaming machine in the installation.
Figure 5:
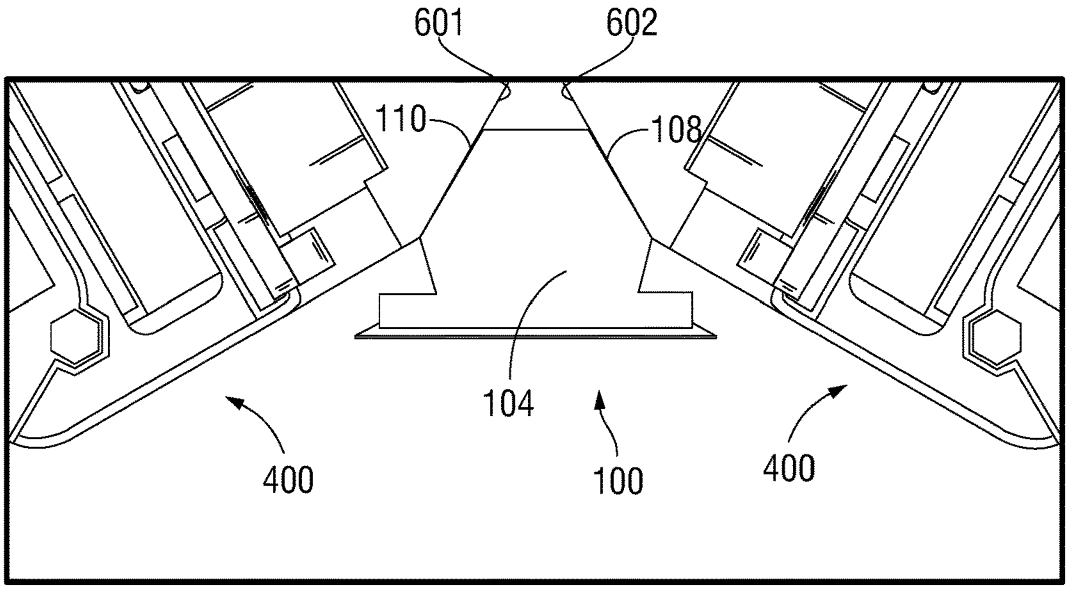
FIG. 5 is a portion of a top view of the gaming machine installation of FIG. 4 showing a light panel as in FIGS. 1-3 positioned between adjacent gaming machines in the installation.
Figure 6:
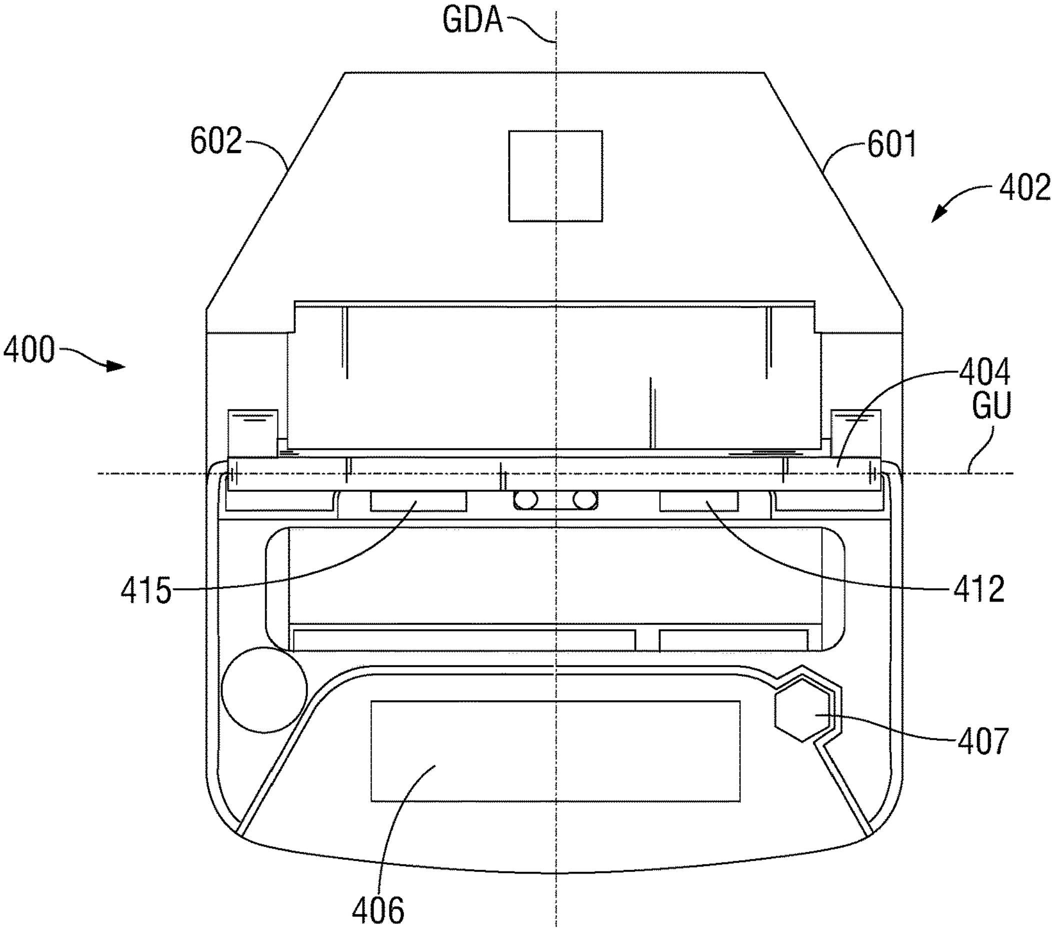
FIG. 6 is a top view of one of the gaming machines shown in FIG. 4.
Figure 7:
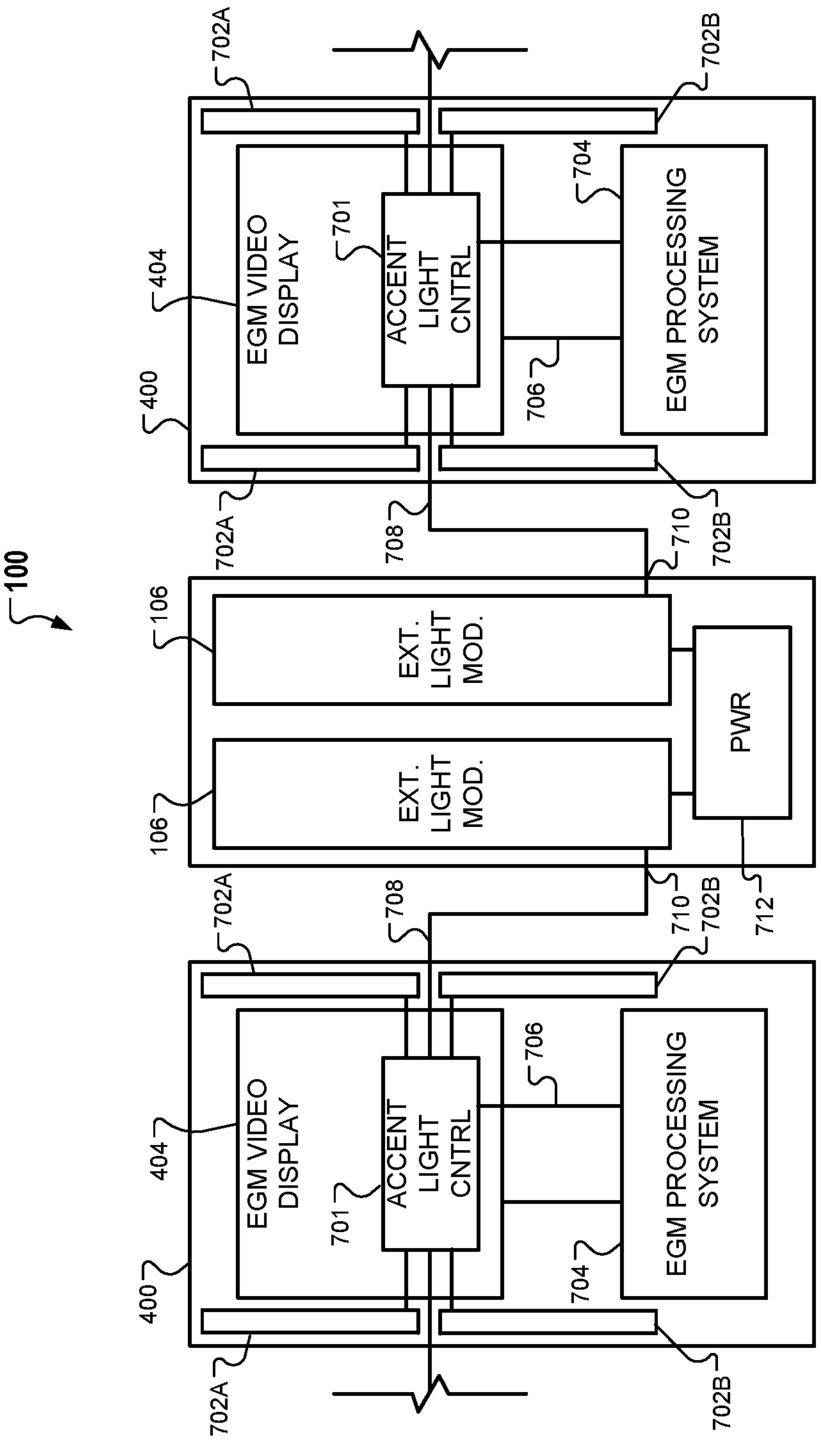
FIG. 7 is a block diagram of a light panel as shown in FIGS. 1-3 operatively connected between two adjacent gaming machines in a gaming machine installation.
Figure 9:
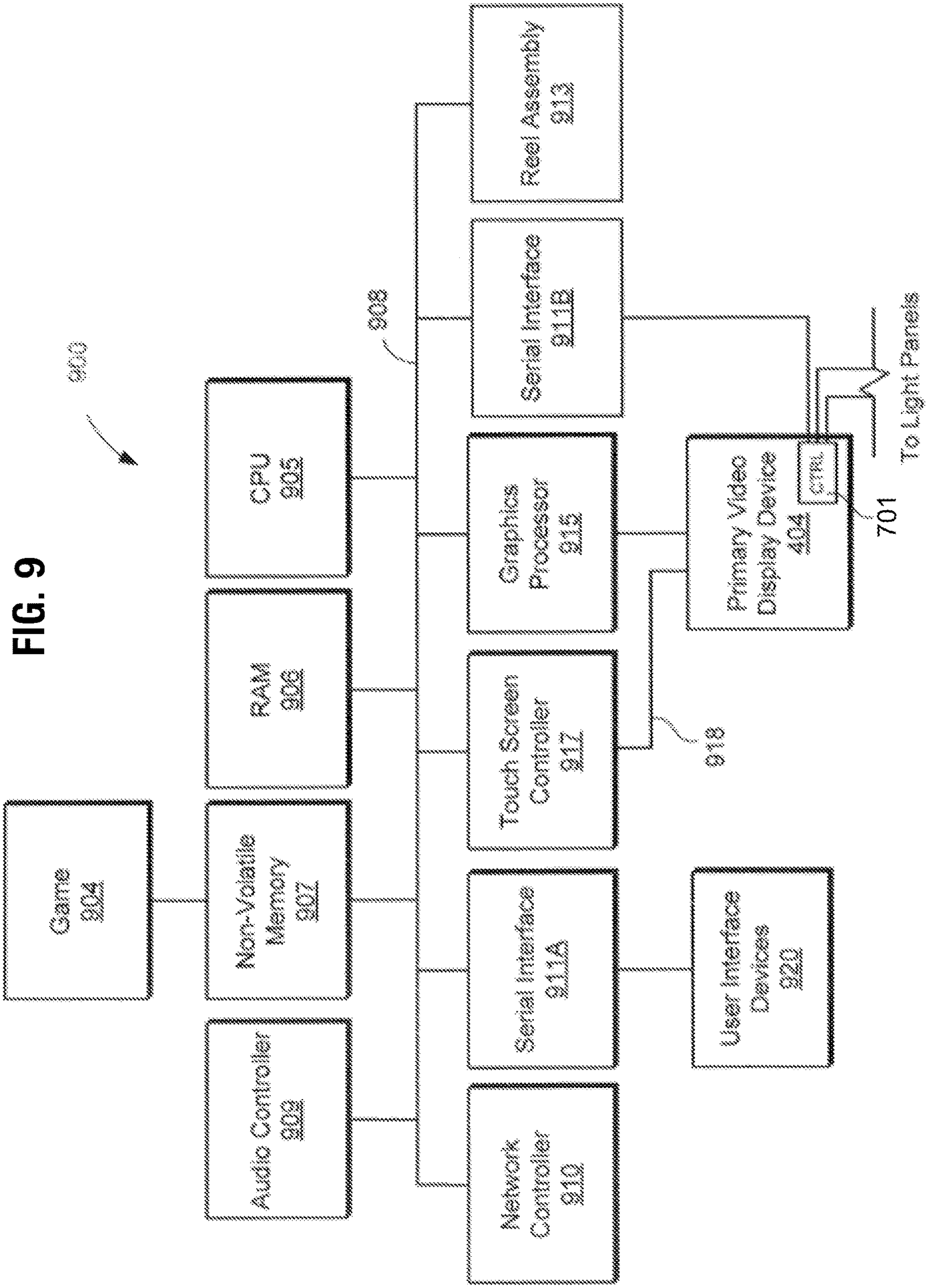
FIG. 9 is a block diagram showing the various components that may be included in the gaming machine shown in FIG. 4.
Figure 10:
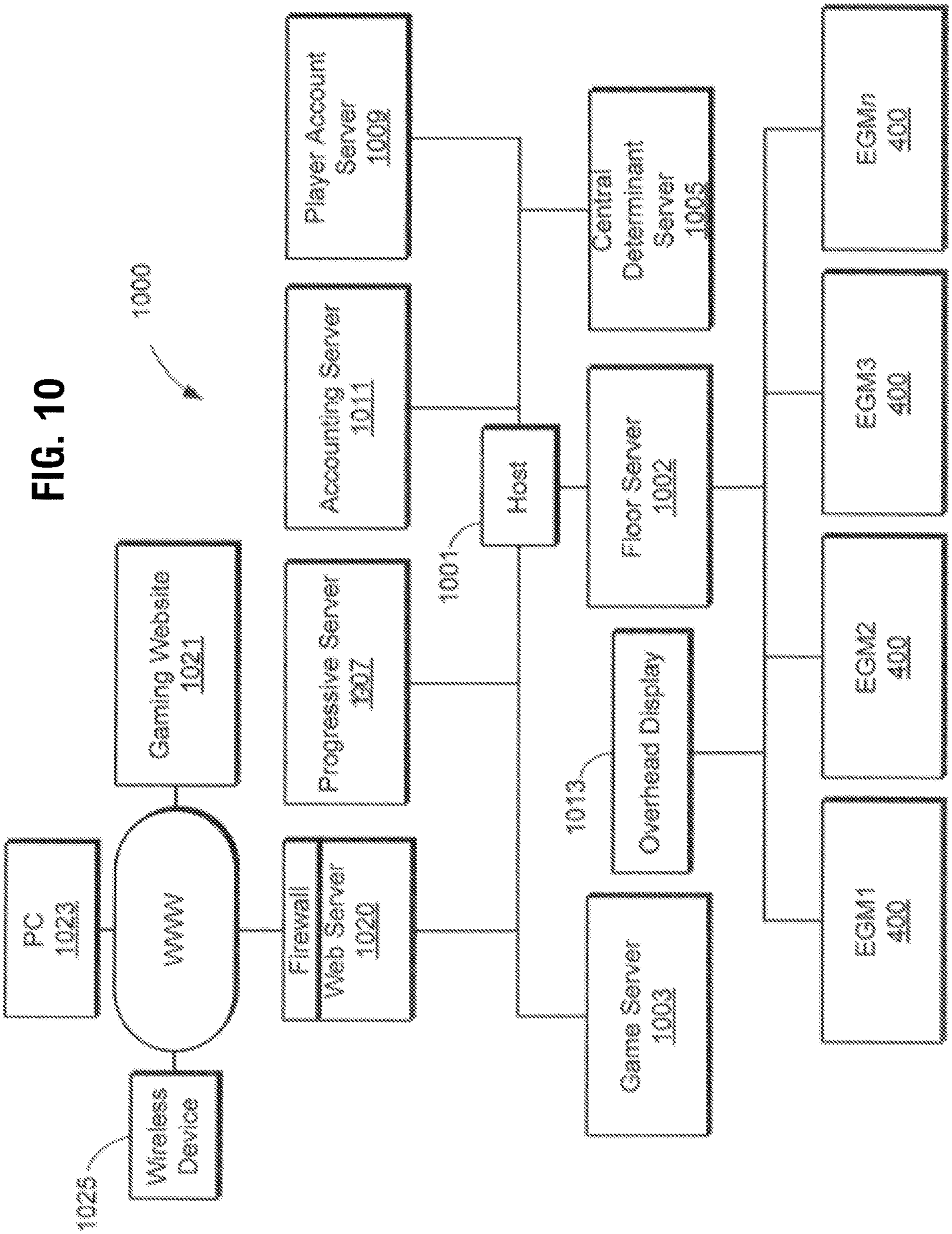
FIG. 10 is a block diagram of a gaming system including gaming machines such as that shown in FIG. 4.

FIGS. 1-3 will be used to describe gaming machine light panel and FIGS. 4-6 will be used to describe how the light panel may be included in a gaming machine installation. FIG. 7 will be referenced in describing how the light panel is controlled by the gaming machines in the installation, while FIG. 8 will be referenced to describe a variation on the light panel configuration shown in FIG. 7. FIG. 9 will be used to describe further details of a gaming machine included in the installation of FIG. 4. FIG. 10 will be referenced to describe gaming networks in which aspects of the present invention may be implemented.

FIGS. 1-3 show different views of a gaming machine light panel 100 which may be installed between two gaming machines in a gaming machine installation. As shown particularly in the perspective view of FIG. 1, light panel 100 includes a light panel front cover 102 and a light panel housing 104 which supports the light panel front cover in an operating position. Light panel front cover 102 is aligned generally along a panel cover plane which is essentially vertical in the orientation of the light panel shown in FIGS. 1-3. This panel cover plane is shown at line PC in the tope view of FIG. 3. Light panel housing 104 extends rearwardly from light panel front cover 102 along a panel depth axis PD (shown in FIG. 3) extending perpendicular to the panel cover plane PC.

As shown by the dashed boxes in FIG. 2, light panel 100 includes two accent light columns 106 (which may also be referred to as "external light modules") extending side-by-side. These two accent light columns 106 are housed within light panel housing 104 and can be controlled by the adjacent gaming machines in an installation as described below to provide various backlighting effects visible through light panel front cover 102. The two accent light columns 106 are shown in dashed lines in FIG. 2 to reflect the fact that they are located in this view behind light panel front cover 102 and housed within the light panel housing. The control of the accent light columns will does be described below in connection particularly with FIG. 7. Because accent light columns 106 may be controlled separately to simultaneously provide different lighting effects, light panel 100 includes a light baffle within light panel housing 104.

As shown particularly in the top view of FIG. 3, light panel housing 104 has a panel back surface including a substantially planar first side surface 108 and a substantially planar second side surface 110. The first side surface 108 extends at an acute angle rearwardly with respect to light panel front cover 102 so as to converge toward the panel depth axis PD in a direction rearwardly from panel cover plane PC. Second side surface 110 extends at an acute angle rearwardly with respect to light panel front cover 102 so as to converge both toward the panel depth axis PD and toward a plane of the first side surface 108 in the direction rearwardly from the panel cover plane PC. As will be described below particularly in connection with FIG. first and second side surfaces 108 and 110 of light panel housing 104 preferably reside at an angle to each other and with respect to the panel cover plane PC (FIG. 3) to substantially abut angled surfaces of the adjacent gaming machine cabinets in a gaming machine installation. This arrangement helps facilitate the installation of the gaming machines at the desired angle with respect to each other and with respect to the light panel 100.

FIG. 4 shows a gaming machine installation 401 including three gaming machines 400 connected so that the gaming machines face outwardly in a triangular arrangement. In this installation a light panel 100 is positioned in an operating position between each gaming machine 400 in position to provide lighting effects between the two adjacent gaming machines. In particular one of the elongated light columns 106 (not shown in FIG. 4) of light panel 100 is positioned to extend along a lateral edge of one of the gaming machines 400 while the other elongated light column 106 of light panel 100 is positioned to extend along a lateral edge of a different one of the gaming machines 400.

Each gaming machine 400 in FIG. 4 includes a cabinet 402 having a front side generally shown at reference numeral 403. A primary video display device 404 is mounted in a central portion of the front side 403, and a touch-screen button panel 406 is positioned below the primary video display device. Gaming machine 400 may include additional smaller auxiliary display devices (not shown) in the area shown generally at 408. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 404, may be used to display graphics associated with a reel-type game and bonus game portion in accordance with aspects of the present invention. As will be described further below in connection with FIG. 9 and elsewhere, it is also possible for gaming machines within the scope of the present invention to include mechanical elements such as mechanical reels. Generally, the display device or display devices of the gaming machine, through which games may be presented may be referred to in this disclosure and the accompanying claims as a "display system" regardless of whether the display arrangement includes video displays, physical reels, or combinations of the two.

Each gaming machine 400 illustrated for purposes of example in FIG. 4 also includes a mechanical control button 407 mounted adjacent to touch-screen button panel 406. This control button 407 may allow a player to make a play input to start a play in a wagering game conducted through gaming machine 400, while virtual buttons included (but not shown in this view) on button panel 406 or other physical buttons or controls (not shown) may allow a player to select a bet level for a game implemented at the gaming machine and select a type of game or game feature. Touch-screen button panel 406 may also be used in implementations of reel-type games encompassing aspects of the invention to allow the player to control a cursor that may be displayed on another display device. Other forms of gaming machines through which the invention may be implemented may include switches, joysticks, or other mechanical input devices, in addition to the virtual buttons and other controls implemented on touch-screen button panel 406. For example, primary video display device 404 in gaming machine 400 provides a convenient display device for implementing touch screen controls in addition to or in lieu of controls included on touch-screen button panel 406 or mechanical controls. The player interface devices which receive player inputs in the course of a game played through the gaming machine, such as controls to select a wager amount for a given play, controls to enter a play input to actually start a given play in the wagering game, or controls to allow a player to make other player inputs in a game according to the present invention, may be referred to generally as a "player input system."

It will be appreciated that gaming machines may also include a number of other player interface devices in addition to devices that are considered player controls for use in entering inputs in the course of a particular game. Gaming machine 400 also includes a currency/voucher acceptor having an input ramp 412, a voucher/receipt printer having a voucher/receipt output 415, and a player card reader (not shown in the view of FIG. 4). Numerous other types of player interface devices may be included in gaming machines that may be used to implement embodiments of the present invention.

Gaming machine 400 may also include a sound system to provide an audio output to enhance the user's playing experience. For example, illustrated gaming machine 400 includes speakers behind grille 416 which may be driven by a suitable audio amplifier (not shown) to provide a desired audio output at the gaming machine.

As shown best in the top view of FIG. 6, the cabinet 402 of a gaming machine 400 includes a back surface define partially by a substantially planar right side housing back surface 601 and partially by a substantially planar left side housing back surface 602. Right side housing back surface 601 extends at an acute angle rearwardly with respect to a gaming machine vertical plane shown at line GV in FIG. 6 so as to converge toward the gaming machine depth axis GDA shown in FIG. 6. The left side housing back surface 602 also extends at an acute angle rearwardly with respect to the gaming machine front surface and plane GV so as to converge toward the gaming machine depth axis GDA and toward the right side housing back surface 601 in a direction rearwardly from the gaming machine front surface and plane GV.

As shown in the top view of FIG. 5, light panel 100 is positioned between two gaming machines 400 with one gaming machine to the right in the orientation of FIG. 5 and one gaming machine to the left of panel 100 in the orientation of FIG. 5. In this installed position, the first side surface 108 of light panel housing 104 substantially abuts the left side housing back surface 602 of the gaming machine to the right and the second side surface 110 of the light panel housing 104 substantially abuts the right side housing back surface 601 of the gaming machine 400 to the left. This abutting relationship not only fixes the position of light panel 100 in the gaming machine installation but also fixes the position of the two adjacent gaming machines 400 in the installation. Thus, light panel housing 104 combines with the angled surfaces of the gaming machine cabinets 402 to provide the desired orientation of both the light panel 100 and gaming machines 400 in the gaming machine installation.

FIG. 7 shows a block diagram of a portion of the gaming machine installation 401 shown in FIG. 4. In particular FIG. 7 shows a block diagram of a light panel 100 installed between two gaming machines 400, each including a video display 404. The block diagram of FIG. 7 also shows that each gaming machine 400 includes a processing system 704 and accent light controller 701, and one or more upper accent light devices 702A and lower accent light devices 702B mounted on the gaming machine cabinet. Typically, upper accent light devices 702A are positioned at the front face of the gaming machine cabinet at each side and extending from the top down to the button deck. In this position each elongated accent light device 702A is arranged with its long axis extending along a lateral edge of display device 404. Typically, lower accent light devices 702B are positioned at the front face, again toward each side, and extend from under the button deck down toward the bottom of the gaming machine cabinet. Accent light devices 702A and 702B may be positioned at the side face of a gaming machine cabinet in some embodiments. Processing system 704 may correspond to the processing system described below in connection with FIG. 9 and particularly the system including a CPU and graphics processor together with associated memory. Accent light controller 701 comprises a controller which receives signals preferably over serial signal path 706 and, in response to those signals from the gaming machine processing system, produces signals to control the accent light devices 702A and 702B of the gaming machine. FIG. 7 shows the accent light controller 701 is included with the video display 404, but other implementations may include the accent light controller separately from the display device. In any event, in accordance with the present invention, accent light controller 701 also provides a control signal along path 708 to a control signal input port 710 of the light panel 100. The signal applied to input port 710 is communicated along a suitable signal path in the light panel 100 to the respective accent light column 106 which in the example of FIG. 7 is labelled "EXT.LIGHT MOD." for external light module. FIG. 7 also shows a power supply 712 associated with light panel 100 for providing operating power to the light columns/external light modules 106.

It will be apparent from FIG. 7 that each light column 106 included in panel 100 is controlled by a different one of the gaming machines 400 through a respective control signal line in 708 and input port 710. In particular, a gaming machine 400 on the right hand side of panel 100 controls the light column 106 on the right hand side of panel 100 in FIG. 7 while the gaming machine 400 on the left-hand side of panel 100 controls the left-hand light column of panel 100. The control signals may be the same control signals used to control the EGM mounted accent lights 702A and 702B so that they operate in coordination with the lights included in the adjacent column 106 of the light panel 100.

Figure 8:
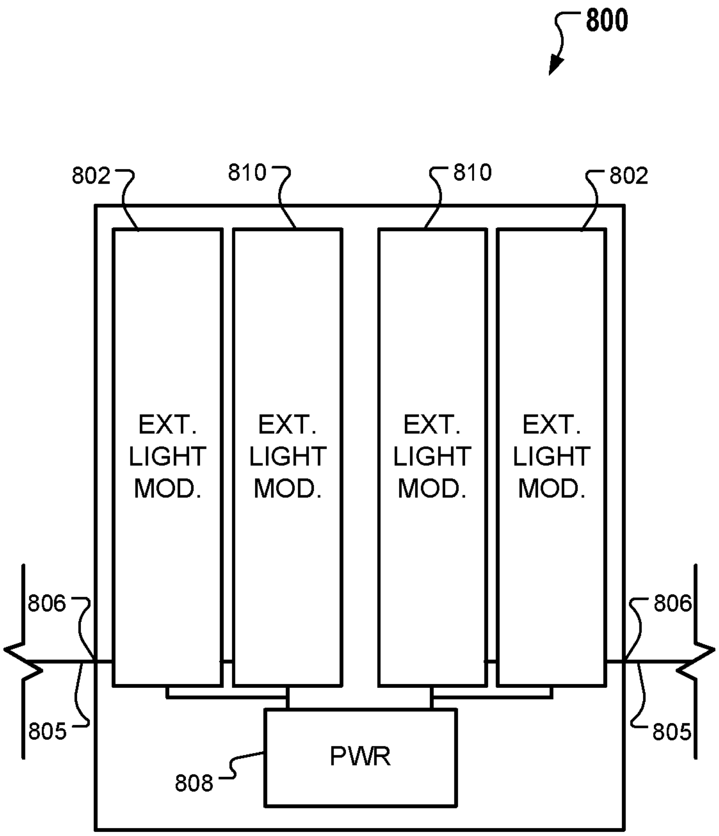
FIG. 8 is a block diagram showing a variation on the light panel shown in FIG. 7.

FIG. 8 shows a block diagram of an alternate light panel 800 which may be connected between two different gaming machines similarly to light panel 100 shown in the block diagram of FIG. 7. Light panel 800 includes two columns 802 corresponding to light columns 106 in FIG. 7. Each light column 802 is connected to receive control signals applied from a light controller over a respective control signal path 805 and control signal input port 806. Panel 800 of FIG. 8 also includes a power supply shown at 808 similar to the power supply 712 shown FIG. 7. In contrast to the light panel 100 shown in FIG. 7, light panel 800 includes an additional accent light column on each side of the panel. In particular FIG. 8 shows a light column 810 connected to receive control signals through light column 802 on the right side of panel 800 and an additional light column 810 connected to column 802 to receive control signals on the left side of the panel. This arrangement of an additional light column 810 in the panel 800 allows the light panel to be wider, which may be desirable in some applications, without having to provide a custom light module specific to such a wider light panel.

FIG. 9 shows a logical and hardware block diagram 900 of gaming machine 400 (FIGS. 4-6) which includes a processor (CPU) 905 along with random access memory (RAM) 906 and nonvolatile memory or storage device 907. All of these devices are connected on a system bus 908 with an audio controller device 909, a network controller 910, and serial interfaces 911A and 911B. A graphics processor 915 is also connected on bus 908 and is connected to drive primary video display device 404 (the display device 404 being mounted on cabinet 402 as shown in FIG. 4). As shown in FIG. 9, gaming machine 400 also includes a touch screen controller 917 connected to system bus 908. Touch screen controller 917 is also connected via signal path 918 to receive signals from a touch screen element associated with primary video display device 404 or touch-screen button panel 406 or both. It will be appreciated that the touch screen element itself typically comprises a thin film that is secured over the display surface of the respective display device such as the display device of touch-screen button panel 406 in FIG. 4. The touch screen element itself is not illustrated or referenced separately in the figures.

Those familiar with data processing devices and systems will appreciate that other basic electronic components will be included in gaming machine 400 such as a power supply, cooling systems for the various system components, audio amplifiers, and other devices that are common in gaming machines. These additional devices are omitted from the drawings so as not to obscure the present invention in unnecessary detail.

All of the elements 905, 906, 907, 908, 909, 910, and 911 shown in FIG. 9 are elements commonly associated with a personal computer, although they may be specially designed and configured for use in a wagering game environment. These elements may be mounted on (or connected to) a standard personal computer motherboard and housed in a standard personal computer housing which itself may be mounted in cabinet 402 shown in FIG. 4. Alternatively, the various electronic components may be mounted on one or more circuit boards housed within cabinet 402 without a separate enclosure such as those found in personal computers. Those familiar with data processing systems and the various data processing elements shown in FIG. 9 will appreciate that many variations on this illustrated structure may be used within the scope of the present invention. For example, since serial communications are commonly employed to communicate with a touch screen controller such as touch screen controller 917, the touch screen controller may not be connected on system bus 908, but instead include a serial communications line to serial interface 911A, which may be a USB controller for example. It will also be appreciated that some of the devices shown in FIG. 9 as being connected directly on system bus 908 may in fact communicate with the other system components through a suitable expansion bus. Audio controller 909, for example, may be connected to the system via a PCI or PCIe bus. System bus 908 is shown in FIG. 9 merely to indicate that the various components are connected in some fashion for communication with CPU 905 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPU 905 or graphics processor such as 915 at the gaming machine, and may instead rely on one or more remote processors. Thus, unless specifically stated otherwise, the designation "gaming machine" is used in this disclosure and the accompanying claims to designate a system of devices which operate together to provide the indicated functions. A "gaming machine" may include a gaming machine such as gaming machine 400 shown in FIGS. 4 and 5, which is itself a system of various components, and may also include one or more components remote from a gaming machine cabinet (that is, cabinet 401 in FIG. 4). Thus the designation "gaming machine" encompasses both a stand-alone gaming machine and a gaming machine (that is, the part housed in a cabinet such as cabinet 402 in FIG. 4) along with one or more remote components for providing various functions (such as identifying prizes for a given play and controlling reel spin simulations, and performing other operations).

It will also be appreciated that graphics processors are also commonly a part of modern computer systems. Although separate graphics processor 915 is shown for controlling primary video display device 404 and secondary video display device 107, CPU 905 or a graphics processor packaged with or included with CPU 905 may control all of the display devices directly without any separately packaged graphics processor. The invention is not limited to any particular arrangement of processing devices for controlling the video display devices included with gaming machine 400. Also, a gaming machine implementing the present invention is not limited to any particular number of video display devices or other types of display devices.

In the illustrated gaming machine 400, CPU 905 executes software, that is, program code, which ultimately controls the entire gaming machine including the receipt of player inputs and the presentation of the graphics or information displayed according to the invention through the display devices 404 and 406 associated with the gaming machine. CPU 905 also executes software related to communications handled through network controller 910, and software related to various peripheral devices such as those connected to the system through audio controller 909, serial interface 911A, and touch screen controller 917. CPU 905 may also execute software to perform accounting functions associated with game play. Random access memory 906 provides memory for use by CPU 905 in executing its various software programs while the nonvolatile memory or storage device 907 may comprise a hard drive or other mass storage device providing storage for game software (program code) prior to loading into random access memory 906 for execution, or for programs not in use or for other data generated or used in the course of gaming machine operation. Network controller 910 provides an interface to other components of a gaming system in which gaming machine 400 may be included. An example network will be described below in connection with FIG. 10.

It should be noted that the invention is not limited to gaming machines employing the personal computer-type arrangement of processing devices and interfaces shown in example gaming machine 400. Other gaming machines through which the invention may be implemented may include one or more special purpose processing devices to perform the various processing steps for implementing the invention. Unlike general purpose processing devices such as CPU 905, which may comprise an Intel® or AMD® processor for example, these special purpose processing devices may not employ operational program code to direct the various processing steps.

The example gaming machine 400 is shown in FIG. 4 as including user interface devices 920 (part of a player input system) connected to serial interface 911A. These user interface devices may include various player input devices such as mechanical buttons, virtual buttons shown on touch-screen button panel 406 in FIG. 4, and/or levers, and other devices. It will be appreciated that the interface between CPU 905 and other player input devices such as player card readers, voucher readers or printers, and other devices may be in the form of serial communications. Thus, serial interface 911A may be used for those additional devices as well, or the gaming machine may include one or more additional serial interface controllers. However, the interface between peripheral devices in the gaming machine, such as player input devices, is not limited to any particular type or standard for purposes of the present invention.

Serial interface 911B in FIG. 9 comprises an interface to controller 701 also shown in FIG. 7. The signals provided to accent light controller 701 direct the controller to produce signals suitable for controlling the light columns 106 of a panel 100 as shown in FIG. 7 (and FIG. 2).

Reel Assembly 913 is shown in the diagrammatic representation of FIG. 9 to illustrate that a gaming machine which may present reel-type games in accordance with aspects of the present invention may also include mechanical reels. For example, a number of sets of mechanical reels may replace the primary display device 404, or at least part of that display device. Alternatively, mechanical reels may be included in the gaming machine behind a light-transmissive video display panel. Mechanical reels may also include one or more video display devices in place of a static reel symbol strip and thus be capable of conducting single-symbol reel spin simulations for one or more game symbol locations. In any case, the mechanical reels represent a display device for displaying various game symbols in the course of a game play. Although the invention is not limited to any particular mechanical reel arrangement or control system, mechanical reels may be controlled conveniently through serial communications which provide instructions for a respective stepper motor for each reel. Thus some embodiments of the present invention which employ mechanical reels may use a serial interface device such as serial interface 911 to control communications with the reel assembly, and may not include a direct bus interconnection as indicated by FIG. 2. Details of a mechanical reel arrangement and various accent lighting arrangements which may be associated with mechanical reels are not shown in the present figures so as to avoid obscuring the present invention in unnecessary detail.

Referring now to FIG. 10, a networked gaming system 1000 associated with one or more gaming facilities may include one or more networked gaming machines 400 (shown in FIG. 10 as EGM1-EGMn) connected in the network by suitable network cable or wirelessly. Networked gaming machines 400 and one or more overhead displays 1013 may be operatively connected so that the overhead display or displays may mirror or replay the content of one or more displays of gaming machines 400. For example, the primary display content for a given gaming machine 400 (including a game play and bonus play according to the present invention) may be transmitted through network controller 910 to a controller associated with the overhead display(s) 1013. In the event gaming machines 400 have cameras installed, the respective player's video images may be displayed on overhead display 1013 along with the content of the player's gaming machine display.

The example gaming network 1000 shown in FIG. 10 includes a host server 1001 and floor server 1002, which together may function as an intermediary between floor devices such as gaming machines 400 and back office devices such as the various servers described below. Game server 1003 may provide server-based games and/or game services to network connected gaming devices such as gaming machines 400. Central determinant server 1005 may be included in the network to identify or select lottery, bingo, or other centrally determined game outcomes and provide the outcome information to networked gaming machines 400 which present the games to players.

Tournament server 1006 may be included in the system for controlling or coordinating tournament functions. These functions may include maintaining tournament player scores and ranking in real time during the course of tournament play, and communicating this information to the various gaming machines 400 participating in the tournament. Tournament server 1006 may also function to enroll players in tournaments, schedule tournaments, and maintain the time remaining in the various tournaments.

Progressive server 1007 may maintain progressive pools for progressive games which may be available through the various gaming machines 400 (such as some prizes defined for the bonus game described further below). In some implementations, progressive server 1007 may simply receive communications indicating contribution amounts which have been determined by processes executing at the various gaming machines 400 or elsewhere in the gaming network. Alternatively, progressive server 1007 may perform processes to determine the contribution amounts for incrementing the various progressive pools which may be maintained. Progressive server 1007 may also periodically communicate current pool values back to the various gaming machines 400, and may participate in communicating awarded progressive prize amounts to the gaming machines and making adjustments to the progressive prize pools accordingly. In some implementations, progressive server 1007 may also determine or participate in determining when a progressive prize triggering event occurs.

Accounting server 1011 may receive gaming data from each of the networked gaming devices, perform audit functions, and provide data for analysis programs. Player account server 1009 may maintain player account records, and store persistent player data such as accumulated player points and/or player preferences (for example, game personalizing selections or options).

Example gaming network 1000 also includes a gaming website 1021 which may be hosted through web server 1020 and may be accessible by players via the Internet. One or more games may be displayed as described herein and played by a player through a personal computer 1023 or handheld wireless device 1025 (for example, a Blackberry® cell phone, Apple® iPhone®, personal digital assistant (PDA), iPad®, etc.). To enter website 1021, a player may log in with a user name that may, for example, be associated with the player's account information stored on player account server 1009. Once logged in to website 1021 the player may play various games on the website, including games according to the invention. Also, website 1021 may allow the player to make various personalizing selections and save the information so it is available for use during the player's next gaming session at a casino establishment having the gaming machines 400.

It will be appreciated that gaming network 1000 illustrated in FIG. 10 is provided merely as an example of a gaming network which may facilitate target interactive games according to aspects of the present invention, and is not intended to be limiting in any way. Reel-type games according to aspects of the present invention are not limited to use with gaming networks such as network 1000.

Any suitable lighting technology may be used in a light column such as light columns 106 as described above. Preferred light columns 106 may employ RGB LED lights to provide the desired effects. These are preferred for their low power usage and for other characteristics. However, a light panel such as 100 or 800 may use any type of light in the panel. Furthermore, although light columns 106 are illustrated, the lights may be divided up and mounted in the panel in any suitable fashion and need not be arranged in a column.

Figure 11:
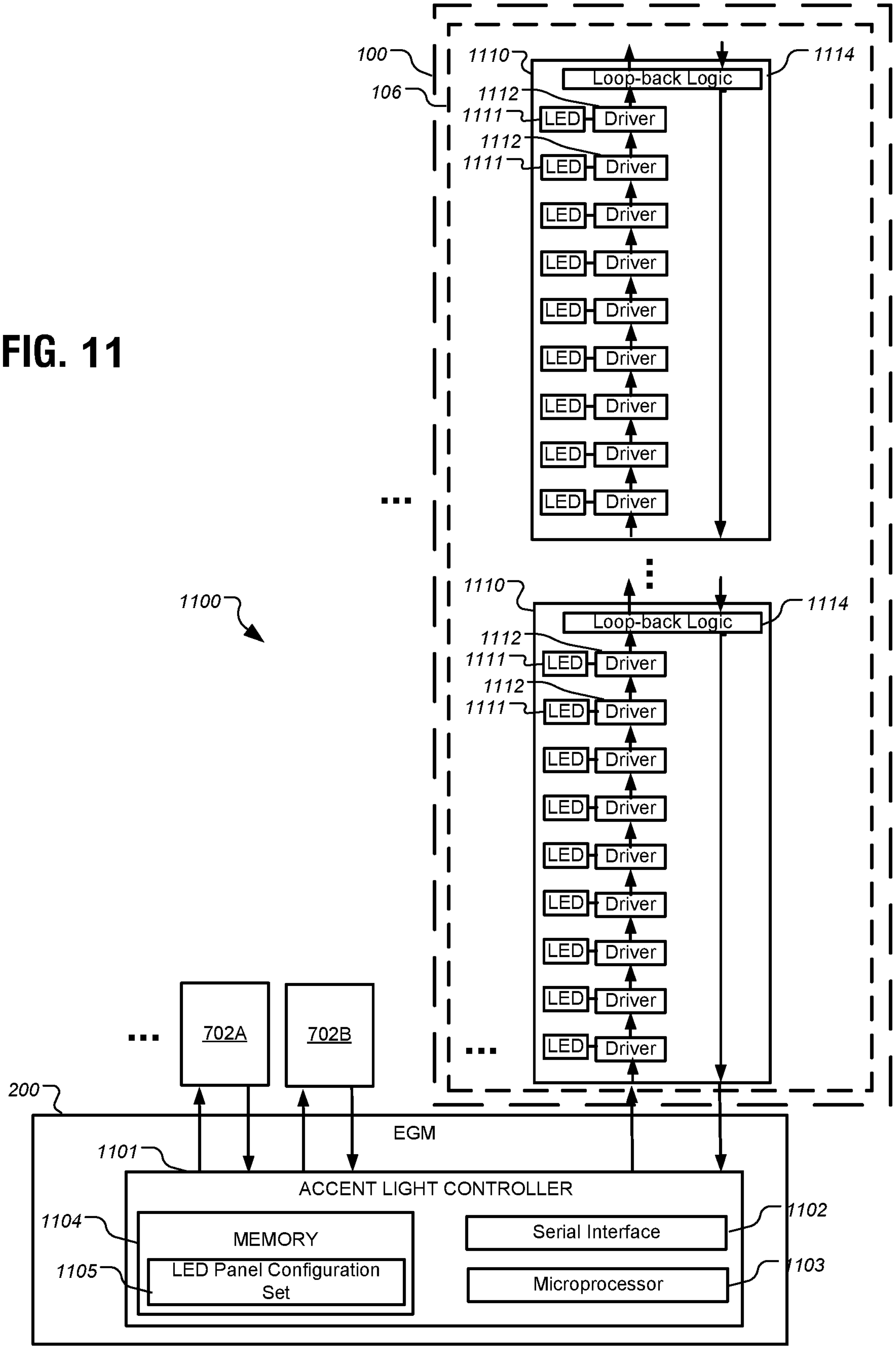
FIG. 11 is a block diagram showing an accent light system according to one embodiment.

FIG. 11 is a block diagram showing an accent light system 1100 according to one embodiment. The system 1100 is employed with an EGM 200 such as those described herein. Accent light controller 1101 is installed in EGM 200 and communicates with a plurality of LED panels 1110 which are arranged in series (that is, connected serially for control signal communication) as depicted at an external lighting panel 100. For example, LED panels 1110 may be combined to form the light columns 106 of light panel 100 (FIGS. 2 and 7), as indicated by the dashed boxes 100 and 106 in FIG. 11. A light panel 100 as described herein may be reconfigurable with different numbers of LED panels 1110 installed to provide a different height, width, coloring, or density of lighting along one or more of its light columns 106. A particular light panel 100 may be replaced with another light panel 100 of a different size with a different array of LEDs. As indicated by the ellipsis, more than one such light panel 100 may be used with an accent light controller 1101. Accent light controller 1101 has the capability to automatically recognize when a light panel or light column is changed in the field and reconfigure itself to control the new arrangement of LED panels, as further described below.

Accent light controller 1101 includes a data communication interface such as serial interface 1102 adapted to connect to a communication channel to communicate with LED panels 1110. Accent light controller 1101 also includes an electronic controller such as microprocessor 1103 which is connected to communicate through serial interface 1102. Memory 1104 is a tangible, non-transitory memory such as flash memory holding software with which microprocessor 1103 is booted and configured. Stored in memory 1104 is an LED panel configuration set 1105 including data needed to recognize LED panels 1110 and configure accent light controller 1101 to command and control LED panels 1110 in various configurations. The operation of accent light controller 1101 will be further described below with respect to FIG. 12 and FIG. 13.

A series of LED panels 1110 is shown each including LEDs 1111, LED drivers 1112 and loop-back logic 1114. Each LED panel 1110 is adapted for mounting along a light panel front cover in an operating position as described above. The plurality of LED drivers 1112 are arranged in series communication, in this example by serial data links connecting adjacent pairs of LED drivers 1110 in a daisy-chain arrangement as depicted. Each LED driver 1112 is coupled to drive a respective LED or set of LEDs 1111, which produce the lighting effects. A loop-back control logic circuit 1114 operable to determine if the LED panel is the final LED panel in a series of LED panels, and if so transmit an indicator in the form of a loop-back signal back through the series of LED panels to an external controller when a command is received at a final one of the LED drivers on the final LED panel. Each loop-back logic circuit has outgoing and incoming serial links in both directions as depicted, is configurable to either forward commands in both directions if it is not on the final LED panel in the series, or loop back commands if it is, as further described below.

While LED panels 1110 are shown positioned in an external light panel 100 in this embodiment, LED panels 1110 in various configurations are also employed in one or more of each of accent light devices 702A and 702B in other embodiments, which are coupled to the accent light controller similarly to external light panel 100 allowing configuration and reconfiguration of accent lights in the gaming cabinet and external to the gaming cabinet as further described below. As indicated by the ellipsis, more than one accent light device 702A or 702B are typically used with an accent light controller 1101 in various embodiments.

Figure 12:
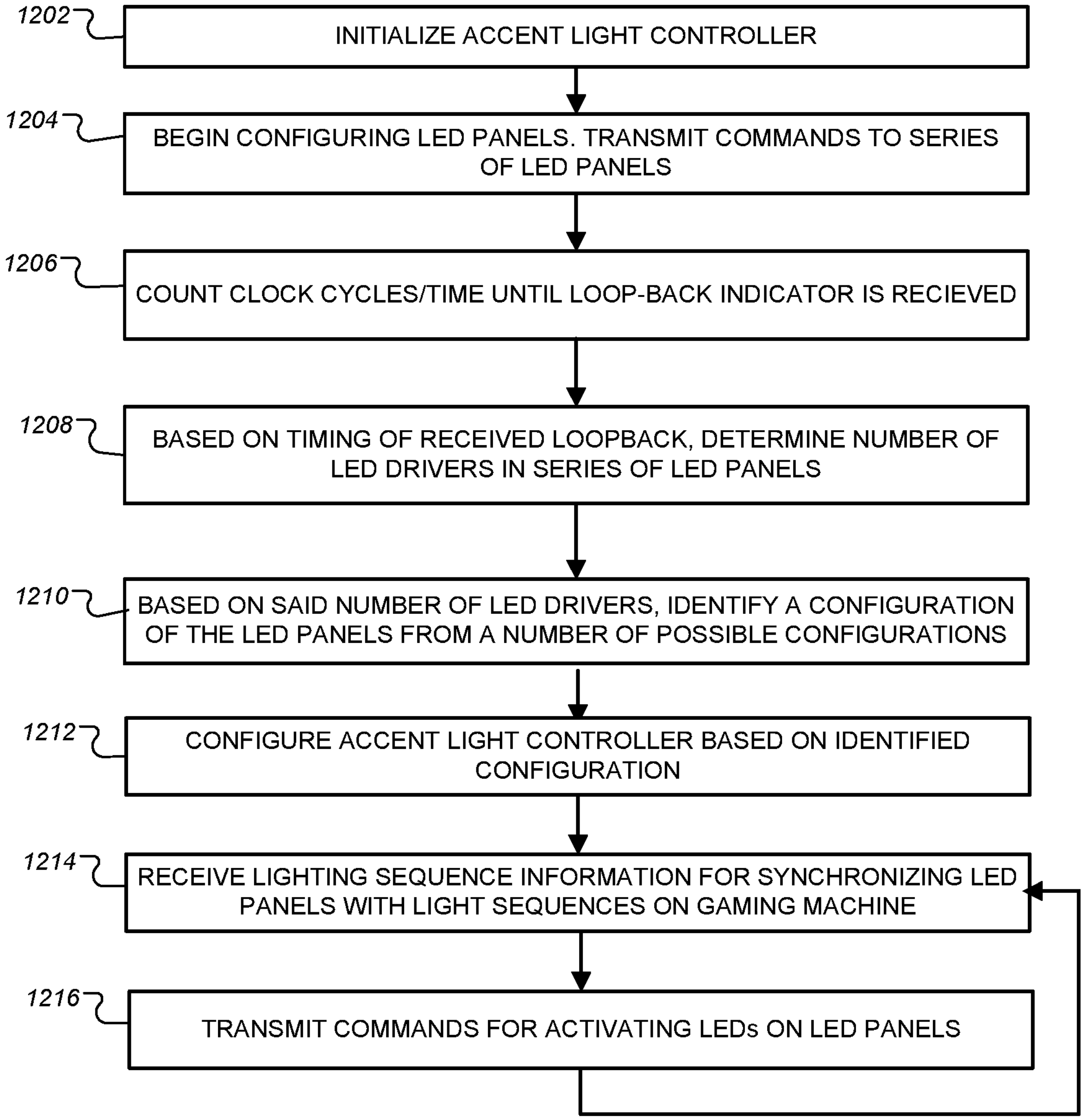
FIG. 12 is a flow diagram of a process for operating an accent light controller according to an example embodiment.

FIG. 12 is a flow diagram of a process for operating an accent light controller according to an example embodiment. The depicted process is performed under control of a processor in an accent light controller such as, for example, of microprocessor 1103 (FIG. 11) executing software commands stored in memory 1104. The process generally allows for configuration and reconfiguration of accent lights at gaming machines without any software or firmware reprogramming of the gaming machines, by allowing the controller to automatically recognize different configurations of LED panels. Such ability is important for regulated casino environments in which software and firmware updates are expensive to perform due to regulatory requirements that may extend to any updates on the gaming machine, not merely those that concern the conduct of the game and credit management. Such ability is also important to allow original deployment of different accent lighting configurations in gaming machines employing identical accent light controller hardware and software. For example, a low cost gaming machine may be deployed with only upper accent light devices 702A installed. Later, the machine may be upgraded while at the casino to include lower accent light devices 702B. Or, accent light devices 702A or 702B may be upgraded to include more LED panels 1110 or a different LED panel configuration. An upgrade may also be performed to add external light modules, such as light column 106 described herein, in external light panels to an existing set of gaming machines. Further, external light panels may be reconfigured to add or remove light panels. All of these scenarios are accomplished with an accent light controller such as accent light controller 1101 interfacing with accent light devices 702A, 702B and accent light panel 100.

The process begins at block 1202 where the accent light controller is initialized, which typically occurs when the host EGM is booted or reset. The initialization includes booting the accent light controller's processor from memory. Then at block 1204, the process begins to automatically configure the accent light controller for controlling the LED panels with which it is in communication. That is, the accent light controller is able to determine the configuration of LED panels that it is paired with and configure itself accordingly to send lighting commands, which occurs at blocks 1204 through 1212. Such automatic configuration allows an EGM to be configured in the field, and reconfigured in the field, without requiring a technician to reprogram the accent light controller each time a different configuration of LED panels is installed with a particular EGM. At block 1204, the process transmits commands to the attached series of LED panels. The actual commands transmitted are not important and may be no-op commands or active commands because the process at this point is determining timing of the command response. At block 1206, the process counts the clock cycles or time until it receives a loop-back signal transmitted from a final one of series of LED panels. Based on timing of said received loop-back signal, the process at block 1208 determines a number of LED drivers in the LED panels. This number may be calculated from the number of data clock cycles (cycles of the clock employed for the serial links between LED drivers 1112, for example) needed to forward a command at each LED driver 1112, which is a known number, and a similar number of data clock cycles employed by loop-back logic 1114 to either forward a command to the next LED panel or loop the command back through each loop-back logic circuit to accent light controller 1101.

Based on this number, at block 1210 the process identifies a configuration of the LED panels from a number of possible configurations. Block 1210 typically includes accessing the LED panel configuration set 1105 (FIG. 11) to look up the current configuration in a set of configurations by using the determined number of LED drivers to access LED panel configuration set 1105. This lookup step provides from the configuration set a unique configuration that is associated with the number of LED drivers identified. While in this embodiment the number of LED drivers is used to lookup the LED panel configuration, other embodiments may employ variations that accomplish a similar identification. For example, the total number of data clock cycles in the delay may be used, or other characteristics of a responsive signal received back from the LED panels at block 1206. LED panel configuration set 1105 typically includes at least one entry for each possible LED panel configuration for which the accent light controller is able to provide commands. For example, different number of LED panels are allowed to be installed in a series like that of FIG. 11, such as one, two, three, four, five, six, seven, eight, nine, or ten panels, as an example. LED Panels of different sizes may also be included as long as their arrangement provides a unique characteristic such as timing that can be identified based on the received loop-back signal. Further, while FIG. 11 shows a single series of LED panels, this is not limiting, and a single accent light controller may include two or more separate serial interface circuits (1102, FIG. 11), each able to control a separate series of LED panels. In such case, the depicted blocks are conducted separately for each series of LED panels. If multiple series of LED panels are employed in such a manner, different configurations may be allowed for each series, or the same configuration may be employed for each series.

Once the current configuration is identified at block 1210, the process configures the accent light controller to control the LED panels based on the identified configuration as shown at block 1212. The configuration may include loading or configuring driver software and memory to hold state information for each LED driver in the identified set, and configuring command procedures to transmit commands for the identified set of LED panels such as by configuring addresses for each LED driver on the panels. The configuration may also include setting timing parameters for controlling the LED panels, setting power parameters, and any other suitable control parameters.

Having configured the accent light controller for controlling the present set of LED panels, the process is ready to operate the LED panels as the EGM is used to provide games and other display sequences such as "attract" displays and group gaming experiences. To perform these ongoing operations, the process at block 1214 receives lighting sequence information for synchronizing the LED panels with other light sequences or graphic displays employed at the host EGM or group displays associated with the host EGM. Block 1214 may include communicating the identified configuration to the EGM video display controller (404, FIG. 4, for example) so that the video display controller has access to the configuration information and is able to select lighting sequences accordingly. In other embodiments, the lighting sequences information may not be specific to any particular configuration of LED panels, and instead may include color and timing information employable with any LED panel configuration.

Based on the received lighting sequence information, the process at block 1216 transmits commands for activating the LED drivers of the LED panels based on the identified configuration. This causes the LED drivers to activate LEDs on the panels in the desired color, brightness, and timing sequence. As can be understood, the sequence may be synchronized with gaming graphics at the EGM, and may include other non-synchronized lighting sequences to be displayed at the LED panels. The process then continues during EGM operation to receive lighting sequence information at block 1214 and transmit commands to implement the lighting sequence at block 1216, as indicated by the arrow looping back to block 1214.

Block 1214 may also include receiving lighting sequence information for synchronizing a lighting sequence of the LED panels with a lighting sequence of other lights mounted in the EGM.

Figure 13:
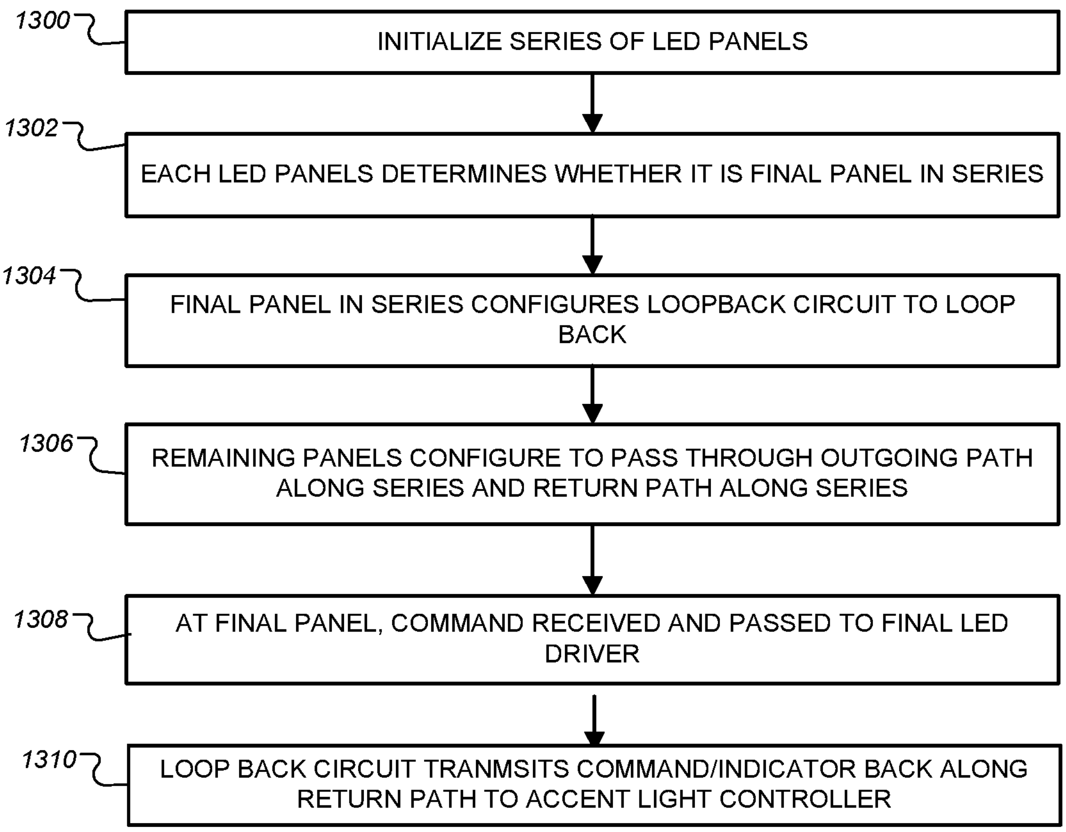
FIG. 13 is a block diagram of a process for LED panels to participate in an automatic configuration process according to some embodiments.

FIG. 13 is a block diagram of a process for LED panels to participate in an automatic configuration process according to some embodiments. For example, the depicted process may be employed with the process of FIG. 12 and the accent light controller system of FIG. 11. The process is typically implemented with digital logic on the LED panels, including the LED drivers 1112 and loop-back logic 1114. The process begins at block 1300, where the LED panels are initialized, which occurs under control of the accent light controller when the EGM is powered up or the lighting system is reset, for example.

At block 1302, each LED panel in the installed series determines whether it is the final LED panel in the series. Block 1302 may include, for example, loop-back logic 1114 detecting whether an LED panel is present at its output. As shown at block 1304, the final LED panel in the series is identified by the loop-back circuit not detecting an additional panel. This final panel configures its loop-back circuit in the loop back configuration in which data and commands received from the LED drivers are sent back to the previous LED panel in the series toward the accent panel controller. This may be done in any suitable way such as the loop-back logic checking for the presence of an LED driver connected to its output, such as by checking an impedance on one of serial link pins. If another LED panel is detected by the loop-back circuit, the current panel is not the final one in the series and the loop-back circuit configures itself to pass-through commands in both directions (outgoing from the accent light controller and incoming toward the accent light controller), as shown at block 1306. While blocks 1302-1306 are shown in order, this is not limiting and typically each LED will configure itself as described when it is initialized.

In operation, commands are passed along the LED drivers and the driver to which a particular command is addressed with implement the command by activating its LEDs as directed. In this embodiment, all commands are passed along the LED drivers to the entire series of LED panels, whether or not they are fulfilled at a particular panel. Other embodiments may include more complex signaling schemes in which commands are forwarded only until they reach their recipient driver. As shown at block 1308, at the final panel in the series, during operation the commands are passed to the final LED driver, and then at block 1310 are passed to the loop-back circuit of the final LED panel where the command is transmitted back along the return data path to the accent light controller. In this manner, the LED panels operate to implement commands from the accent light controller and to assist the accent light controller in automatically detecting the LED panel configuration and configuring the accent light controller as described above.

As can be understood, the system of FIG. 11 and the techniques of FIG. 12 and FIG. 13 may be employed with any suitable arrangement of light panels, including those described herein. In such case a light panel is adapted to be installed between two gaming machines and includes a light panel front cover aligned along a panel cover plane, a light panel housing supporting the light panel front cover in an operating position, and an accent light assembly housed within the light panel housing and comprising a plurality of LED panels such as LED panels 1110 adapted for mounting along the light panel front cover in an operating position. Each LED panel includes a plurality of LED drivers arranged in series communication and coupled to drive respective LEDs, and loop-back control logic operable to determine if the LED panel is the final LED panel in a series of LED panels, and if so transmit an indicator back through the series of LED panels to an external controller when a command is received at a final one of the LED drivers on the final LED panel.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as "front," "back," "upper," "lower," "right," "left" and the like with reference to a given feature are made with reference to the orientation of the light panel and gaming machines and gaming machine installations shown in the drawings.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements that does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A method including:

(a) transmitting a command to an accent light arrangement associated with a gaming machine so that the command is communicated serially through each of a number of LED panels included in the accent light arrangement;

(b) receiving a loop-back signal from the accent light arrangement;

(c) at an electronic controller operatively connected to the accent light arrangement, identifying a configuration of the number of LED panels included in the accent light arrangement from a number of possible configurations based on a timing of the received loop-back signal relative to the command transmitted to the accent light arrangement; and (d) transmitting subsequent commands for operating the accent light arrangement based on the identified configuration.

2. The method of claim 1 wherein identifying the configuration of the number of LED panels includes:

(a) at the electronic controller, identifying a number of LED drivers in the accent light arrangement; and (b) identifying the configuration of the number of LED panels based on the identified number of LED drivers.

3. The method of claim 2 wherein identifying the number of LED drivers in the accent light arrangement includes identifying a number of data clock cycles for the command to pass through the number of LED panels and the loop-back signal to pass through the number of LED panels back to the electronic controller.

4. The method of claim 2 wherein identifying a configuration of the number of LED panels includes comparing the identified number of LED drivers in the accent light arrangement to a set of stored configuration data for multiple different LED panel configurations.

5. The method of claim 1 further comprising detecting at a final LED panel in the accent light arrangement that the final LED panel is at a final location in the accent light arrangement.

6. The method of claim 5 further including generating the loop-back signal at a loop-back logic circuit of the final LED panel based on the detection that the final LED panel is at the final location in the accent light arrangement.

7. The method of claim 1 wherein one of the number of LED panels included in the accent light arrangement comprises an elongated LED panel mounted to extend along an edge of a display device of the gaming machine.

8. The method of claim 1 wherein one of the number of LED panels included in the accent light arrangement comprises an elongated LED panel mounted to extend along a lateral edge of a cabinet of the gaming machine.

9. A gaming machine including:

(a) a cabinet;

(b) a display device mounted on the cabinet;

(c) an accent light arrangement including a number of LED panels connected serially for control signal communication; and (d) an electronic controller coupled through a data communication interface to the accent light arrangement, the electronic controller being configured for, (i) transmitting a command to the accent light arrangement through the data communication interface so that the command is communicated serially through each of the number of LED panels included in the accent light arrangement; and (ii) identifying a configuration of the number of LED panels included in the accent light arrangement from a number of possible configurations based on a timing of a received loop-back signal from the accent light arrangement relative to the command transmitted to the accent light arrangement.

10. The gaming machine of claim 9 wherein the electronic controller is also configured for transmitting subsequent commands to the accent light arrangement through the data communication interface for operating the accent light arrangement based on the identified configuration.

11. The gaming machine of claim 9 wherein the number of LED panels includes an elongated LED panel mounted to extend along an edge of a display device of the gaming machine.

12. The gaming machine of claim 9 wherein the number of LED panels includes an elongated LED panel mounted to extend along a lateral edge of the cabinet.

13. The gaming machine of claim 9 wherein the number of LED panels includes an external LED panel mounted externally to the gaming machine.

14. The gaming machine of claim 13 wherein the external LED panel is mounted in a light panel housing connected to the cabinet.

15. A light system for a gaming machine, the light system including:

(a) an accent light arrangement including a number of LED panels connected serially for control signal communication; and (b) an electronic controller coupled through a data communication interface to the accent light arrangement, the electronic controller being configured for, (i)transmitting a command to the accent light arrangement through the data communication interface so that the command is communicated serially through each of the number of LED panels included in the accent light arrangement; and (ii) identifying a configuration of the number of LED panels included in the accent light arrangement from a number of possible configurations based on a time of receipt of a loop-back signal relative to the command transmitted to the accent light arrangement, the loop-back signal being generated in the accent light arrangement in response to the command and communicated back to the electronic controller.

16. The light system of claim 15 wherein the electronic controller is further adapted for, receiving lighting sequence information for synchronizing a lighting sequence of the number of LED panels with a lighting sequence of lights mounted in the gaming machine.

17. The light system of claim 15 wherein identifying the configuration of the number of LED panels included in the accent light arrangement from number of possible configurations further comprises determining a number of LED drivers in the number of LED panels included in the accent light arrangement.

18. The light system of claim 17 wherein determining the number of LED drivers in the number of LED panels included in the accent light arrangement includes determining a number of data clock cycles for the command to pass through the number of LED panels and the loop-back signal to return back to the electronic controller.

19. The light system of claim 17 wherein identifying the configuration of the number of LED panels included in the accent light arrangement comprises comparing the number of LED drivers in the number LED panels included in the accent light arrangement to a set of stored configuration data for multiple different LED panel configurations.

20. The light system of claim 15 wherein one of the number of LED panels includes an elongated LED panel mounted to extend along a lateral edge of a display device of the gaming machine.

* * * * *